May 15, 1956 K. F. TESH 2,745,977
MOTOR FRAME STRUCTURE AND BRUSH RIGGING
Original Filed Oct. 19, 1951 2 Sheets-Sheet 1
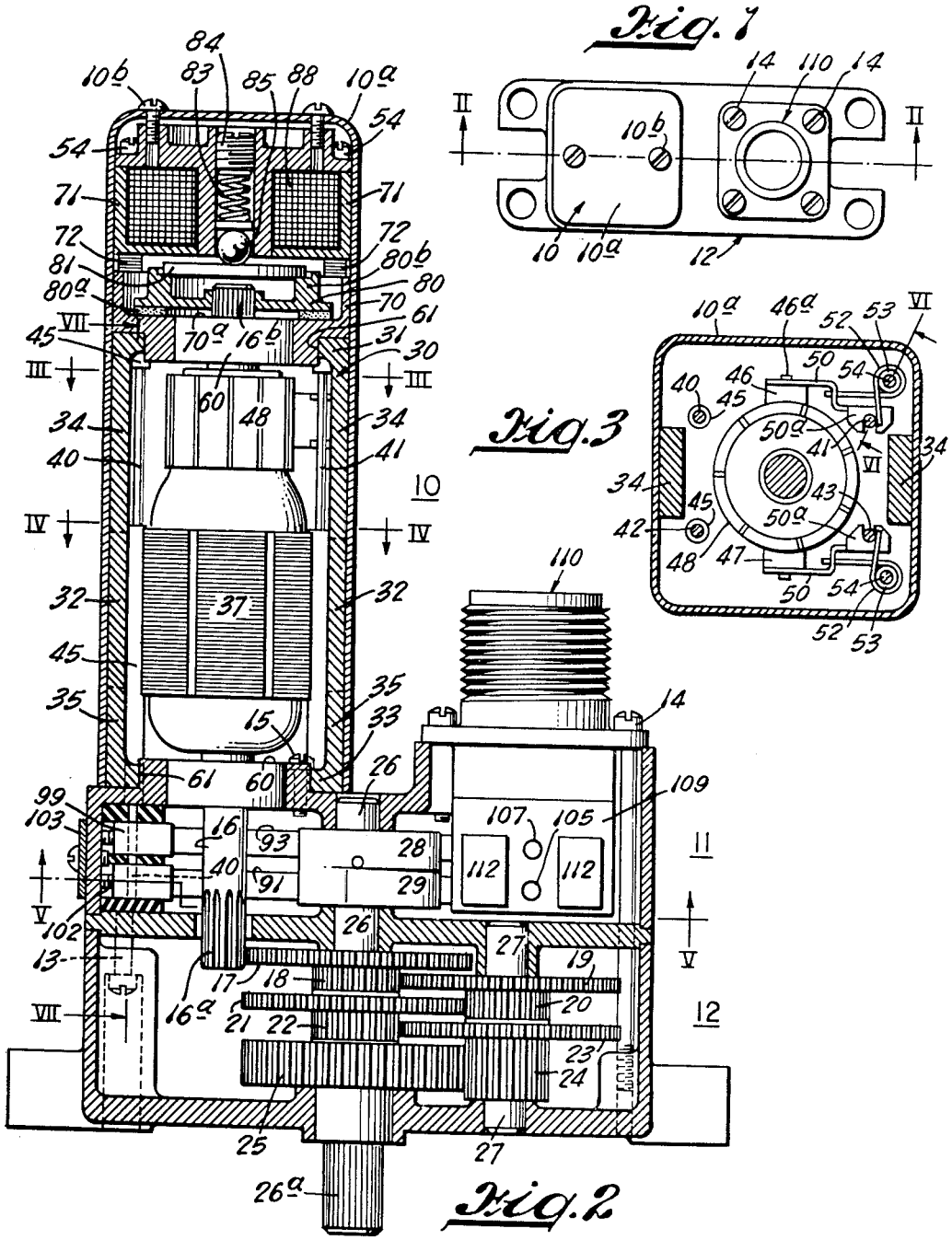
INVENTOR.
Kimble F. Tesh
BY
ATTORNEY

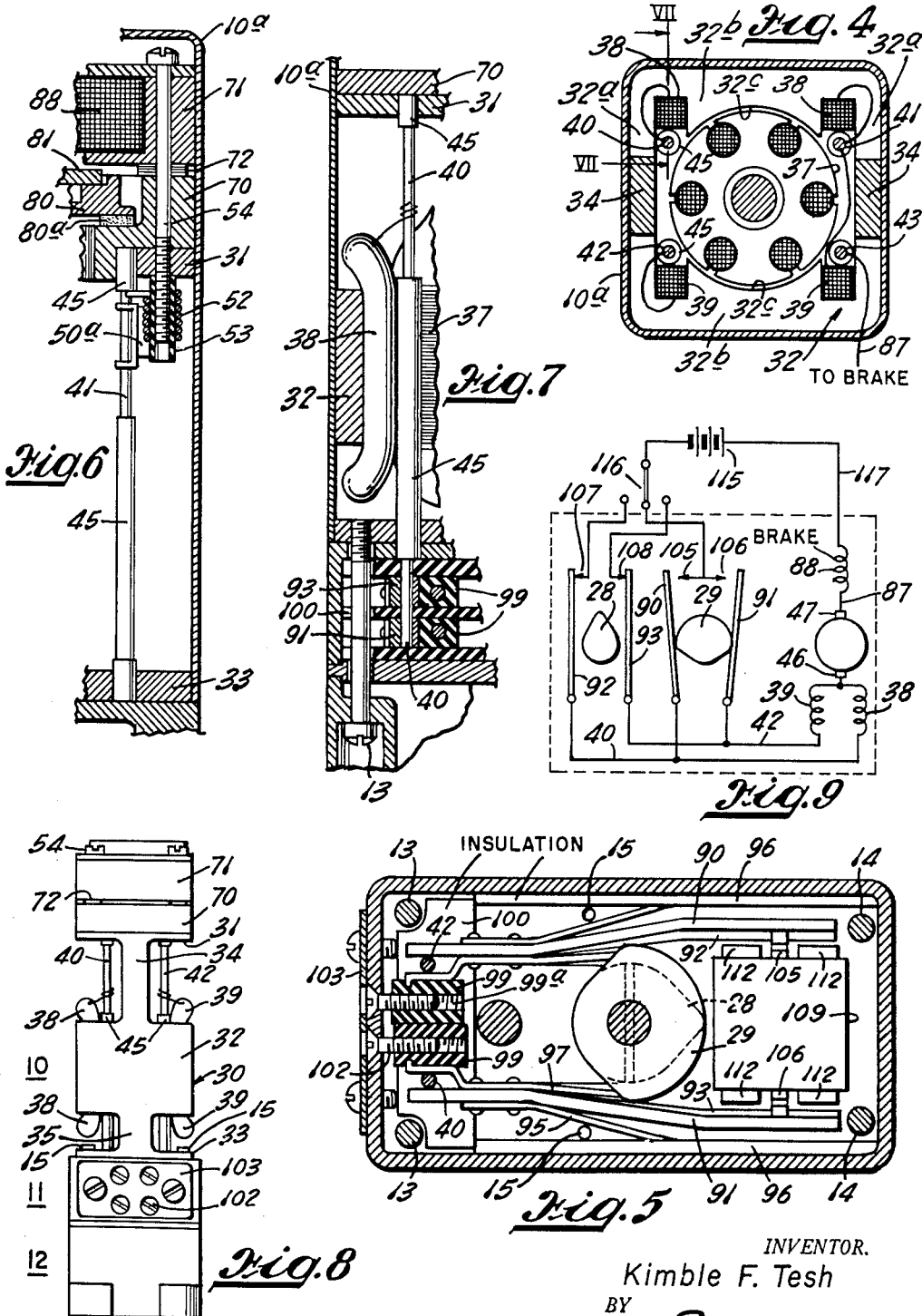

United States Patent Office 2,745,977
Patented May 15, 1956

2,745,977

MOTOR FRAME STRUCTURE AND BRUSH RIGGING

Kimble Frank Tesh, Santa Monica, Calif., assignor to Bendix Aviation Corporation, North Hollywood, Calif., a corporation of Delaware Original application October 19, 1951, Serial No. 252,155. Divided and this application November 21, 1952, Serial No. 321,793

4 Claims. (Cl. 310—239)

This invention relates to small electric motors for operating various control devices such as valves, switches, etc. from a remote point, by simply closing an electric circuit.

An object of the invention is to provide an electric motor of very small size relative to its power.

Another object is to provide an electric motor construction that combines extreme compactness with simple rugged assembly of the parts.

Other more specific objects and features of the invention will appear from the description to follow.

The invention relates to a tiny electric motor adapted to be coupled by a speed-reducing, torque multiplying, gear train to an output shaft adapted to be connected to a valve or other device to be actuated. The output shaft actuates a shut-off switch, which switch de-energizes the motor automatically and applies a brake to stop it quickly and lock the output shaft when the latter has been rotated through a predetermined angle. The invention resides in details of design and assembly of such units which reduce their size and simplify their construction without impairing their performance. These details of design will be explained in the following description, with reference to the drawing, and are particularly defined in the claims.

This is a division of my application Serial No. 252,155 filed October 19, 1951, entitled Electrical Actuator.

In the drawing:

Fig. 1 is a plan view of a complete actuator incorporating a motor in accordance with the invention.

Fig. 2 is a vertical section in the plane II—II of Fig. 1.

Figs. 3, 4 and 5 are cross sections in the planes III—III, IV—IV and V—V of Fig. 2.

Fig. 6 is a vertical detail section in the plane VI—VI of Fig. 3.

Fig. 7 is a vertical detail section in the plane VII—VII of Figs. 2 and 4.

Fig. 8 is an end elevation of the actuator, with the cover removed; and

Fig. 9 is a schematic diagram showing the electrical circuit of the actuator.

Referring to Fig. 2, the actuator depicted therein is made up of three sections, namely, a motor section 10, a switch section 11, and a gear train section 12. The three sections are detachably secured together by screws 13 extending up from the gear train section 12 into the motor section 10, and by screws 14 extending down through the switch section 11 and into the gear train section 12. The motor section 10 is additionally secured to the switch section 11 by screws 15. A removable cover can 10a is secured to the motor section by screws 10b.

The motor section 10 has a motor shaft 16 extending down through the switch section 11 and into the gear train section 12. The lower end of this shaft has gear teeth 16a which mesh with a gear 17 in the gear train section 12. The gear 17 is freely rotatable on a shaft 26 and has secured thereto a pinion 18 which meshes with a gear 19 which is freely rotatable on a shaft 27, and has secured thereto a pinion 20 which meshes with a gear 21 which is also free to rotate on the shaft 26, and has a pinion 22 secured thereto which meshes with a gear 23 which, with an associated pinion 24 secured thereto, is rotatable on the shaft 27. The pinion 24 meshes with a gear 25 which is secured to the shaft 26 for rotation therewith. The shaft 26 constitutes the output shaft for driving the switch, valve, or other element to be actuated. It extends below the lower end of the actuator and is provided with a splined end 26a for connection to the device to be actuated. The gear train provides a very large speed reduction and a corresponding torque multiplication between the motor shaft 16 and the output shaft 26.

It will be observed that the motor shaft 16 extends through the switch section 11 but it does not have any driving connection with the latter. The output shaft 26 also extends through the switch section 11 and is journaled in the upper and lower walls thereof. It carries one or more cams 28, 29 in the switch section, which actuate the switch contacts. The operation of this portion of the apparatus will be described in detail later.

The motor section 10 comprises a main frame 30 which consists of an upper end wall section 31, a motor field section 32, a lower end wall section 33, a pair of opposite connecting sections 34 connecting the upper end wall section 31 to the motor field section 32, and a pair of opposite connecting sections 35 connecting the field section 32 to the lower end wall section 33. These different sections of the frame are most clearly shown in the end elevation view of Fig. 8. All the different sections of the frame 30 are rigidly connected together either by forming them from a single piece of stock or by welding or brazing the parts together. The field section 32 must, of course, be of magnetic material such as soft iron, and the other sections 31, 33, 34 and 35 may be of the same material.

Referring to Fig. 4, the field section 32 of the frame is of rectangular exterior cross section, two sides 32a of which are of uniform thickness and the same thickness as the connecting sections 34—34 and 35—35 to which they are joined. The other two opposite sides of the field section 32 are extended inwardly to form two field poles 32b—32b having cylindrical inner faces 32c—32c respectively which are closely juxtaposed to the armature 37 of the motor. A field winding 38 encircles on of the pole pieces 32b, and a field winding 39 encircles the other pole piece 32b. The field winding 38 is retained in position by a pair of bus bars 40 and 41, and the field winding 39 is retained in position by a pair of bus bars 42 and 43 respectively. Tubular insulation 45 surrounding the bus bars 40, 41, 42 and 43 insulates them from and provides cushioning between them and the field windings.

As shown in Fig. 4, one terminal of the field winding 38 is connected to the bus bar 40, and one terminal of the field winding 39 is connected to the bus bar 42. The other terminals of the two windings are both connected to the bus bar 41. All four bus bars are mechanically supported in the frame end members 31 and 35, as shown in Fig. 2, apertures being provided therefor in the end walls 31 and 33, and the insulating bushings 45 electrically insulating the bus bars from the end walls. The upper ends of the bus bars do not extend beyond the upper end wall 31, but the bus bars 40 and 42 extend through the lower end wall 33 into the switching section 11, where they complete connection between the field windings and the rest of the circuit. The bus bars 41 and 43 do not extend through the lower end wall. They mechanically support and make electrical connection to the two motor brushes 46 and 47 respectively (Fig. 3) which bear against the usual commutator 48 which is secured to the upper end of the armature 37. Each brush 46 and 47 is formed of carbon and is relatively thin and is secured to a supporting clip 50 formed from sheet metal and having a saddle outer end section 50a which rides on the bus bar 41 or 43. Each brush may be secured to its clip 50 in electrically conducting relation by copper-plating the rear face of the brush and soldering it to the clip 50. A small boss 46a on the rear side of the brush is extended through an aperture provided therefor in the clip 50 to reinforce the connection. Each brush is spring-urged against the commutator by a torsion spring 52 which is wound around an insulating tube 53 supported on the end of a retaining screw 54 which extends from the brake section of the motor. One end of the torsion spring 52 is engaged by the bus bar and the other end extends through an aperture provided therefor in the clip 50. The brush construction described provides brushes of sufficient area to carry relatively large currents, without extending radially as far from the commutator as conventional brushes do.

The motor shaft 16 is rotatably supported by ball bearings 60 pressed into bushing members which in turn are pressed into apertures 61 provided therefor in the opposite end walls 31 and 33 respectively. The radius of these apertures 61 is the same as the radius of curvature of the pole faces 32c, so that the pole faces and the bearing apertures can be machined in extremely accurate alignment with each other by the use of a single boring, reaming, or honing tool. This is an important feature of the invention because it enables a very small air gap between the armature and the field pole faces. This small gap has the advantage of not only greatly increasing the power available from a motor of a given size, but enables successful operation of the motor on either one of the two field windings 38 or 39 alone. The small air gap so greatly reduces the reluctance of the magnetic circuit that, with only one of the fields 38 or 39 energized, the flux is only slightly larger in the pole which is directly energized than in the opposite pole. The field 38 is poled to magnetize the field in one direction, and the field winding 39 is poled to magnetize the field in the opposite direction, to provide direction selectivity in the operation of the motor. Heretofore it has been considered necessary, where reversible operation was to be obtained, to provide two field windings on each pole piece.

As previously indicated, a brake is provided for locking the motor against rotation when it is not energized. This brake is mounted at the upper end of the motor, above the upper end wall 31. It includes a lower brake frame member 70 (the lower end of which constitutes the bushing supporting the upper bearing 60), and a solenoid 71 positioned thereabove, which are maintained in desired spaced relation by spacer shims 72, and are anchored together and to the upper motor end wall 31 by the screws 54 which extend downwardly through apertures provided therefor in the solenoid 71 and the brake frame member 70, and are threaded into the upper motor end wall 31. As previously mentioned, two of these screws 54 extend past the upper motor end wall 31 and function as mechanical supports for the brush springs 52. The other two screws terminate at the lower surface of the motor upper end wall 31.

The upper face 70a of the brake frame member 70 constitutes a braking surface and is highly polished. Positioned immediately above this surface 70a is a brake plate 80 having a lining of cork or similar material 80a on its lower surface for frictional engagement with the surface 70a. The brake plate 80 is provided with a central splined aperture which engages the splined upper end 16b of the motor shaft for rotation therewith and longitudinal sliding movement with respect thereto. The plate 80 is provided with an upwardly extending flange 80b against which there rests a disc 81 of magnetic material such as iron, constituting the armature of the solenoid 71. This disc 81 is urged downwardly by a helical compression spring 83 which is compressed between an adjusting screw plug 84 positioned thereabove, and a ball 85 interposed between the lower end of the spring and the armature 81. The spring 83 maintains brake plate 80 in frictional engagement with the stationary surface 70a except when the solenoid is energized. Energization of the solenoid lifts the disc 81, compressing the spring 83, to permit the brake plate 80 to rotate with respect to the brake surface 70a. One terminal of the solenoid winding 88 (Fig. 2) is connected by a lead 87 (Fig. 4) to the bus bar 43 which supports and is electrically connected to the brush 47 (Fig. 3). The other terminal of the solenoid winding 88 is grounded to the frame of the device.

As previously indicated, the switch section 11 contains a pair of cams 28 and 29 which actuate contacts for opening and closing the motor circuit to cause the output shaft 26 to be rotated through a desired angle in either direction and automatically stopped. Referring to Fig. 5, the lower cam 29 actuates two contact arms 90 and 91 respectively, and the upper cam 28 actuates two contact arms 92 and 93, which are behind arms 90 and 91 respectively, in Fig. 5. Contact arm 93 is shown in Fig. 2. All four arms are identical and hence a description of arm 91 suffices for all. Arm 91 is electrically connected to and pivots about the bus bar 40 which, as previously explained, extends from the motor section of the device down to the switch section. Arm 91 has riveted to its outer face a restoring spring 95 in the form of a leaf spring, the outer end of which contacts a strip of insulation 96 which lies against the wall of the switch housing. This spring 95 exerts a force constantly on the contact arm 91, urging it toward the cam 29. On the inner side of the contact arm 91 there is riveted a second leaf spring 97, the free end of which is normally displaced away from the arm 91 and is adapted to be contacted by the cam 29. The other end of the spring 97 is bent away from the arm 91 to define therewith a slot which receives the bus bar 40. The extreme left end of the spring 97 is upset and extends into a groove provided therefor in a block of insulating material 99. There are four of these insulating blocks 99, one for each of the four springs 90, 91, 92 and 93, and they are retained against lateral movement by the inner springs 97 and the bus bars 40 and 42 respectively. The two lower blocks 99—99 associated with the contact arms 90 and 91 respectively are separated from the two upper blocks 99—99, associated with the contact arms 92 and 93 respectively, by a horizontal insulating strip 100 which is retained in position by the two insulating strips 96—96 which lie against the opposite side walls of the switch housing. Each block 99 has a threaded aperture 99a therein into which there is extended an adjusting screw 102. The head of the screw lies exterior of the switch housing, but is partially covered by a plate 103 having holes therein aligned with the head, to permit adjustment. Since longitudinal movement of the screws 102 with respect to the housing is prevented, rotation of any screw shifts the associated insulating block 99 to move the associated contact arm longitudinally in the housing.

There are four stationary contacts 105, 106, 107 and 108, associated with the movable contact arms 90, 91, 92 and 93 respectively. These contacts are molded in a single block of insulating material 109 containing prongs which extend into a socket 110 (Fig. 2) which is mounted on the top of the switch housing 11 and is adapted to receive a standard plug for connecting the actuator to the control circuit. The two contacts 105 and 106 associated with the contact arms 90 and 91 respectively are electrically connected together, and hence they can be formed as a single bar extending through the insulating block 109. The stationary contacts 107 and 108 are electrically disconnected from each other and are therefore formed separately.

To produce a snap action of the movable contact springs, they are made of magnetic material such as iron or steel, and there are embedded in the insulating block 109 permanent magnets 112 which are closely positioned to their associate contact arms when the latter are lying against their associated fixed contacts.

It will be observed from inspection of Fig. 5, that the free end of the leaf spring 97 is beveled and that the spring is of such length that the cam rides against the beveled end and forces the spring toward its associated arm 91. The inner spring 97 is made relatively weak as compared to the holding force exerted by the permanent magnets 112 and the outer spring 95, so that deflection of the inner spring 97 by the cam will not produce enough force to dislodge the contact arm from its inner position, in which it rests against its associated fixed contact. However, continued movement of the cam forces the free end of the spring 97 against the arm 91, and further rotation of the cam then imparts a positive force to the arm 91 to shift it away from its associated fixed contact 106. As soon as such movement occurs, the increase in the air gap between the arm 91 and the permanent magnets 112 reduces the magnetic attraction to a point where the stressed spring 97 is able to overcome the spring 95 and snap the arm 91 into open position. Movement of the cam in direction to release the arm 91 first permits the inner spring 97 to separate from the arm 91 until the force of the spring 95 is able to move the arm 91 toward its fixed contact 106. This movement reduces the air gap between the arm and the permanent magnets 112—112 so that the latter become effective to snap the contact arm into closed position.

Referring to Fig. 9, it will be observed that the actuator may be operated by a source of current such as the battery 115 and a switch 116 located at a remote point. One terminal of the battery may be connected by a lead 117 to one terminal (the grounded terminal) of the brake solenoid 88. It will be apparent from the previous description, that the other terminal of the solenoid 88 is connected to one of the motor brushes 47, and that the other motor brush 46 is connected to one terminal of each of the field windings 38 and 39. As shown in Fig. 9, the other terminal of the field winding 38 is connected both to the movable contact arm 90 and the movable contact arm 92, whereas the other end of the other field winding 39 is connected to the movable contact 91 and the movable contact 93. The remote switch 116 is adapted to connect the other terminal of the current source 115 selectively either to the contacts 105 and 106 simultaneously, or to the contact 108, or to the contact 107. As shown in the drawing (Fig. 5), the actuator output shaft 26 is in a neutral position into which it has been moved by connection of the source 115, through the switch 116, to the fixed contacts 105 and 106. The movement of the shaft 26 into neutral position caused the cam 29 to open both of the contact arms 90 and 91 off their associated fixed contacts 105 and 106, thereby de-energizing the motor. In this position, the cam 28 is inactive, and both of the contact arms 92 and 93 are closed on their associated fixed contacts 107 and 108 respectively. Let it be assumed now that the switch 116 is moved to apply current to the fixed contact 107. This completes a circuit from the battery, through the contacts 107 and 92, and through the field winding 38, thence through the armature of the motor and through the brake solenoid winding 88 back to the source. Energization of the solenoid winding 88 releases the brake so that the motor can run, and the direction in which it runs is determined by the polarity of the field winding 38. The polarity is such that the cams 28 and 29 are rotated counterclockwise, as viewed in Fig. 9. It will be observed that rotation of the output shaft and the cam 28 therewith through 90 degrees opens the movable contact arm 92 off the fixed contact 107, thereby opening the motor circuit, and stopping the actuator in the new position.

The subsequent actuation of the switch 116 to apply current to the contact 108 completes the circuit to the motor through the other field winding 39 which is poled opposite to the field winding 38, thereby causing the motor to run in the opposite direction. Thereupon, the cam 28 rotates in clockwise direction, and at the end of 180 degrees of movement it will open the movable contact arm 93 off the fixed contact 108 and stop the motor in a new position displaced 90 degrees clockwise from the original neutral position.

If, after application of current to either the fixed contact 107 or 108 to move the shaft into either end position, it is desired to restore the shaft to neutral position, the switch 116 is manipulated to apply current to the fixed contacts 105 and 106. If at this time the output shaft and the cam 29 are in extreme clockwise position, the contact arm 90 will be closed on contact 105, thereby energizing the motor through the field winding 38 to rotate the shaft and the cam 29 in counterclockwise direction. When the cam reaches neutral position, as shown in Fig. 9, it opens the arm 90 off the fixed contact 105 to stop the motor. On the other hand, if at the time current was applied to contacts 105 and 106 the shaft had been in the extreme counterclockwise position, then the contact arm 91 would have been closed on the contact 106, and current would have been applied through the field winding 39 to the motor to cause the latter to run in clockwise direction back into neutral position.

It is to be understood that the cam shapes shown in the drawing are merely representative of many shapes that can be employed, depending upon the particular angle through which it is desired to rotate the output shaft. Furthermore, different numbers of cams and associated contacts can be employed to obtain special operating characteristics. The invention does not lie in the particular circuit herein disclosed but rather in the structure of the elements which permits a varied number of contacts and came to be employed.

Although for the purpose of explaining the invention, a particular embodiment thereof has been shown and described, obvious modifications will occur to a person skilled in the art, and I do not desire to be limited to the exact details shown and described.

I claim:

1. In an electric motor: an integral elongated frame comprising a hollow field core of rectangular exterior shape in cross section and having a pair of inwardly extending poles in one pair of opposite sides, the sides of said poles being spaced from the other pair of opposite sides, and field windings encircling said poles; said integral frame member including end walls at opposite ends of and spaced from said field core and of the same exterior size and shape in cross section; longitudinal connecting members extending longitudinally from the mid-section of said other opposite sides of said core to said end walls whereby said end walls and core constitute a rigid integral frame all portions of the exterior lateral surfaces of which are flush with respect to each other; a motor shaft extending axially through said frame, and an armature on said shaft within said field core in close running clearance therewith; said end walls having cylindrical bearing apertures of the same radius, and coaxial with each other, and said field poles having faces lying in the same cylindrical plane as said apertures; and bearing means for rotatably supporting said shaft, said bearing means having concentric inner and outer surfaces tightly fitting said shaft and said bearing apertures respectively.

2. In an electric commutator motor: a motor frame comprising a circumferentially continuous field core of rectangular exterior cross section; end walls spaced from said field core and secured thereto; one pair of opposite sides of said field core having inwardly extending poles, and field windings on said poles; an armature assembly rotatably supported in said end walls and comprising a commutator; a plurality of rods extending longitudinally between and insulatingly anchored at opposite ends in said end walls; brush assemblies oscillatably engaging some at least of said rods for pivotal movement thereabout against said commutator; some at least of said rods extending through one of said end walls and constituting bus bars electrically connecting elements in said motor frame with elements exterior of said one end wall; a switch housing secured to the exterior face of said one end wall; a switching mechanism in said switch housing comprising a fixed contact and a movable contact arm; and means supporting said movable contact arm on that portion of one of said rods that extends through said one end wall, whereby said rod constitutes the electrical connection between an element in said motor and said movable contact arm and pivotally supports said arm for swinging movement against and away from said fixed contact.

3. In an electric commutator motor: a motor frame comprising a circumferentially continuous field core of rectangular exterior cross section; end walls spaced from said field core and secured thereto; one pair of opposite sides of said field core having inwardly extending poles, and field windings on said poles; an armature assembly rotatably supported in said end walls and comprising a commutator; a plurality of rods extending longitudinally between and insulatingly anchored at opposite ends in said end walls; brush assemblies oscillatably engaging some at least of said rods for pivotal movement thereabout against said commutator; said commutator and brush assemblies being adjacent one of said end walls; an auxiliary housing positioned against the exterior face of said one end wall; retaining screws for said auxiliary housing extending through said one end wall and therebeyond in parallel juxtaposed relation to said brush-engaging rods; insulating tubes on the extended ends of said screws; and a helical torsion spring on each of said insulating tubes, each spring having one end engaging one of said brush assemblies for urging it against said commutator and against its pivotal rod, and the other end engaging said pivotal rod, whereby said springs urge said brush assemblies into contact with both the commutator and said pivotal rods and provide an auxiliary electrical path between the brush assemblies and said pivotal rods.

4. A motor according to claim 3 in which said brush assemblies each comprise a metal strip having lateral notched flanges at one end for engaging said rods, and a flat-backed carbon brush soldered to the face of the other end of said strip.

References Cited in the file of this patent

UNITED STATES PATENTS

| | | |
|---|---|---|
| 278,122 | Fuller | May 22, 1883 |
| 344,801 | Freeman | June 29, 1886 |
| 406,015 | Willson | June 25, 1889 |
| 626,496 | Lundell | June 6, 1899 |
| 2,234,926 | Jepson | Mar. 11, 1941 |
| 2,279,982 | Glynn | Apr. 14, 1942 |
| 2,329,151 | Brady | Sept. 7, 1943 |
| 2,629,061 | Swarthout | Feb. 17, 1953 |

FOREIGN PATENTS

| | | |
|---|---|---|
| 322,989 | Germany | July 13, 1920 |